(12) United States Patent
Behbehani

(10) Patent No.: US 8,876,657 B1
(45) Date of Patent: Nov. 4, 2014

(54) AUTOMATIC GEAR BIKE

(71) Applicant: Fawzi Behbehani, Salwa (KW)

(72) Inventor: Fawzi Behbehani, Salwa (KW)

( * ) Notice: Subject to any disclaimer, the term of this patent is extended or adjusted under 35 U.S.C. 154(b) by 0 days.

(21) Appl. No.: 14/218,553

(22) Filed: Mar. 18, 2014

(51) Int. Cl.
*B60W 10/08* (2006.01)
*B60K 7/00* (2006.01)
*F16H 48/34* (2012.01)

(52) U.S. Cl.
USPC ............ 477/20; 475/5; 475/150; 475/153; 180/170; 180/206.6

(58) Field of Classification Search
USPC ............ 475/5, 150, 153; 477/3, 20, 107, 110; 180/170, 178, 179, 206.1, 206.2, 206.6
See application file for complete search history.

(56) References Cited

U.S. PATENT DOCUMENTS

| | | | |
|---|---|---|---|
| 5,226,501 A | 7/1993 | Takata | |
| 5,370,200 A | 12/1994 | Takata | |
| 5,505,277 A | 4/1996 | Suganuma et al. | |
| 6,629,574 B2 * | 10/2003 | Turner | 180/206.4 |
| 6,684,971 B2 * | 2/2004 | Yu et al. | 180/206.2 |
| 7,706,935 B2 * | 4/2010 | Dube al. | 701/22 |
| 8,172,022 B2 | 5/2012 | Schneidewind | |
| 8,256,554 B2 | 9/2012 | Chan | |
| 8,364,389 B2 * | 1/2013 | Dorogusker et al. | 701/300 |
| 8,414,438 B2 * | 4/2013 | Wenthen | 475/5 |
| 8,449,421 B2 * | 5/2013 | Jung et al. | 475/12 |
| 2011/0183794 A1 | 7/2011 | Chan | |
| 2011/0183805 A1 | 7/2011 | Chan | |
| 2011/0303474 A1 * | 12/2011 | Kimmich et al. | 180/206.3 |
| 2012/0012412 A1 * | 1/2012 | Moeller et al. | 180/206.2 |
| 2012/0130603 A1 * | 5/2012 | Simpson et al. | 701/51 |
| 2013/0145885 A1 * | 6/2013 | Kitamura et al. | 74/473.12 |

FOREIGN PATENT DOCUMENTS

DE 102004 002 789 A1 12/2005
GB 2336575 A * 10/1999

OTHER PUBLICATIONS

Ecospeed. (2012) Fall 2012, Introducing Advanced Sine Modulation; less noise more torque, 1300 Watts http:// www.ecospeed.com.

* cited by examiner

*Primary Examiner* — Roger Pang
(74) *Attorney, Agent, or Firm* — Richard C Litman

(57) ABSTRACT

The automatic gear bike includes a control system for selectively operating in an automatic mode, providing power to the bike or a manual mode. The control system includes a control assembly, a motor assembly operatively in communication with the control assembly, and a gear assembly in operative engagement with the motor assembly. The gear assembly includes a ration gear, a hub, and hub embedded gear. The ration gear is operatively connected to the beam gear, and the hub embedded gear is connected to the hub. The controller receives detects the real-time bike speed, and compares the bike speed to a pre-selected bike speed. Based on the comparison the controller sends a signal to the motor assembly to selectively transfer power to the beam gear and operatively connected gear assembly, to increase or decrease the bike speed such that the real-time bike speed is substantially equal to the pre-selected speed.

10 Claims, 15 Drawing Sheets

| biker | ERG rotation speed | Tire rotation speed | Hall effect | Computer response | DC motor voltage |
|---|---|---|---|---|---|
| Stop | zero | zero | No reading | No command | Zero volts |
| Start to move | maximum | Greater than zero | reading | Runs ERG at maximum | 4 |
| 1 km/h | 39 km/h | 1 km/h | reading | Maintain speed | 3.9 |
| 2 km/h | 38 km/h | 2km/h | reading | Decreases speed of ERG | 3.8 |
| 10 km/h | 30 km/h | 10 km/h | reading | Decreases speed of ERG | 3 |
| 30 km/h | 10 km/h | 30 km/h | reading | Decreases speed of ERG | 1 |
| 40 km/h | zero | 40 km/h | reading | Stops ERG | zero |
| 10 km/h | 30 km/h | 10 km/h | reading | increases speed of ERG | 3 |
| Drags the bike | off | 1 km/h | off | Turn off | off |

*Fig. 11*

AUTOMATIC GEAR BIKE

BACKGROUND OF THE INVENTION

1. Field of the Invention

The present invention relates to a bike. More particularly, the present invention relates to an automatic gear bike having a speed control system to automatically control the speed of the bike.

2. Description of the Related Art

In general, riding a bike at a constant bike speed can be rather difficult. It is even more difficult to maintain a constant speed when riding on a rough terrain, or an inclined surface. Some automatic bike systems can assist the user during the bike ride, however do not permit, in real time, for the speed of the bike to be remotely controlled by the user. Further, most powered bike systems are not multi-functional, enabling the user to selectively operate the bike in a manual mode, or an automatic mode, if desired.

Accordingly, it is desirable to provide a bike having a control system that can, in real-time, automatically assist a rider to maintain a desired pre-programmed speed. It is further desirable to provide a bike that uses a control system that enables the rider to select between automatic speed control and manual speed control.

SUMMARY OF THE INVENTION

The automatic gear bike includes a speed control system for automatically controlling the speed of the bike. The control system includes a control assembly, a motor assembly and a gear assembly. The control assembly includes a controller in communication with at least one sensor, which detects the bike's velocity and sends a signal back to the control controller.

The motor assembly is in communication with the controller and adapted to receive control signals from the controller. The motor assembly includes a motor controller, a transmitter, a motor and a beam gear operatively connected to receive power from the motor. The motor assembly provides assistance to the bike operator, such that the operator can operate the bike at a preselected velocity.

The gear assembly includes a ration gear operatively connected to the beam gear. The beam gear transfers power to the gear assembly through the ration gear to selectively move the gear assembly. The controller receives from the at least one sensor, a detected speed of the bike and compares the detected bike speed to a desired bike speed and, based upon the comparison, controls the motor to selectively move the beam gear to transfer power to the ration gear corresponding to an amount of power to move the gear assembly to achieve the desired bike speed.

In an embodiment, the controller includes a manual lever for selecting the desired bike speed. The manual lever is positioned proximate to the hand gear. The lever is in communication with the motor assembly to control the speed of the motor.

In an embodiment, the gear bike includes a braking assembly in communication with the controller and operatively connected to the ration gear. The controller can be a manual lever that sends a signal to the braking assembly to control movement of the ration gear, thereby controlling the operating mode and speed of the bike.

These and other features of the present invention will become readily apparent upon further review of the following specification and drawings.

BRIEF DESCRIPTION OF THE DRAWINGS

FIG. 11 is a table illustrating an example of the relationship of the bike speed and rotational speeds of the ration gear and motor.

Similar reference characters denote corresponding features consistently throughout the attached drawings.

DETAILED DESCRIPTION OF THE PREFERRED EMBODIMENTS

Figure 1:
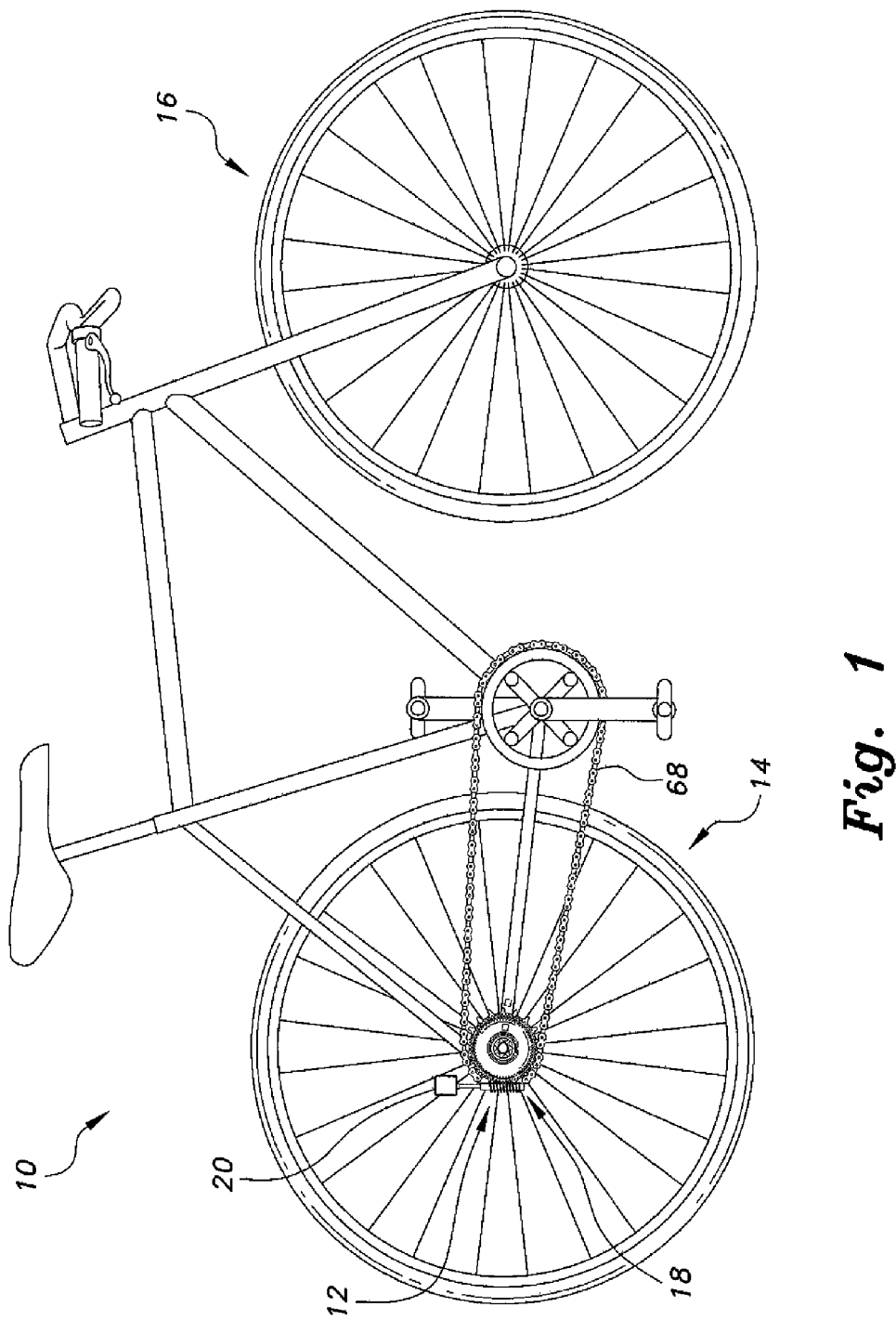
FIG. 1 is a side view of an exemplary automatic gear bike adapted to selectively provide automatic speed control including a gear assembly, control assembly and motor assembly, according to the present invention.

The automatic gear bike, generally referred to by reference number 10 in the drawings, permits a user to selectively operate a bike in manual mode, or automatic mode to maintain a desired bike velocity. Referring now to FIG. 1, there is shown an embodiment of the automatic gear bike 10 including a speed control system 12 for facilitating automatic speed control.

In manual mode, the automatic gear bike 10 operates substantially similar to that of a traditional bike. The user's pedaling generates the power that drives the bike 10. Conversely, in automatic mode, the speed control system 12 controls the speed of the bike, by detecting the bike speed in real-time, and comparing the detected bike speed value to a pre-selected bike speed value. Based on the comparison between the real-time and pre-selected speed values, the control system 12, selectively provides powered assistance to the bike 10, either increasing, or decreasing the bike's speed, such that the real-time speed substantially matches the preselected speed.

As shown, the speed control system 12 is mounted to the bike 10, and operatively connected to a rear tire 14 of the bike 10, to selectively transfer power to the tire 14. While the speed control system 12 is applicable for operative connection to the rear tire 14, it notably can also be positioned on a front tire 16 of the bike 10 to control the speed of the front tire 16, and accordingly, should not be construed in a limiting sense. As further shown in FIG. 1, the speed control system 12 can include a gear assembly 18 for transferring power to the rear tire 14, a motor assembly 20 in operative engagement with the gear assembly 18 to provide power to the gear assembly 18, and a control assembly 22 adapted to control power transferred from the motor assembly 20 to the gear assembly 18.

The motor assembly 20 is remotely connected to the control assembly 22 to selectively provide power to the gear assembly 14. Continuing with FIG. 2, the motor assembly 20 includes a motor 24, which can be a DC motor 24 or any other suitable type of motor 24, capable of selectively providing power to the motor assembly 20. The motor assembly 20 further includes a beam gear 26, a shaft 28 to enable power transfer from the motor 24 to the beam gear 26, a power source 30 for providing power to the motor 24, a motor controller 32 for controlling power flow to the motor 24, and a transmitter 34 for transmitting and receiving a signal from the motor assembly 20 to the control assembly 22.

The power source 30 can be a battery, or solar power cell, for example, or any source of power suitable for powering the motor 24. The motor controller 32 is adapted to receive a control signal from the control assembly 22 to selectively control power sent to the motor 24. As such the motor controller 32 controls whether the motor 24 is on or off. The transmitter 34 is adapted to receive signals from the control assembly 22. The transmitter 34 can communicate with the control assembly 22 through a hard wired connection, or remote wireless connection, such as Bluetooth, GPS, infrared, or radio, for example.

Figure 2:
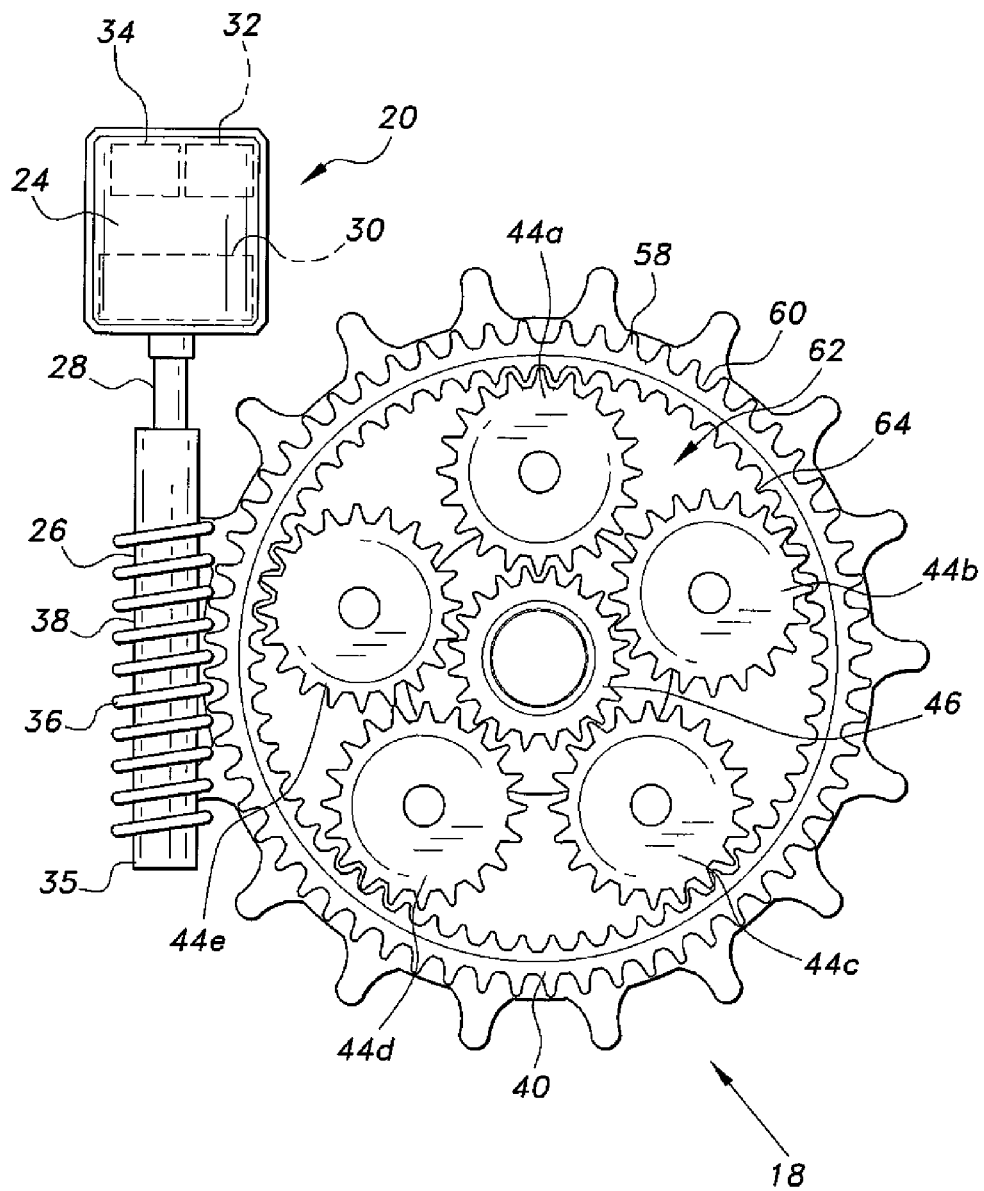
FIG. 2 is a side view of the gear assembly cooperatively engaging of the motor assembly, according to the present invention.

The beam gear 26 is adapted to transfer power from the motor 24 to the gear assembly 18. As shown in FIG. 2, the beam gear 26 can have a generally cylindrical configuration, which can include a base 35 having a plurality of teeth 36, extending generally outwardly from the base 35. Groove 38 is formed in between each respective tooth 36, and is configured for operative engagement with the gear assembly 18. In automatic mode, the motor 24 rotates the beam gear 26 axially transferring power from the beam gear 26 to the gear assembly 18.

As stated, the gear assembly 18 is adapted to receive power from the motor assembly 20 and transfer that power to the rear tire 14, in automatic mode. Continuing with FIGS. 2 and 3, the gear assembly 18 can include an electrical ration gear 40 ("ERG" or "ration gear") adapted to operatively engage the beam gear 26, to transfer power from the motor assembly 20 to the gear assembly 18. As shown, the ration gear 40 has a generally circular configuration including a plurality of external teeth 58 and respective grooves 60 formed in between the external teeth 58. As shown, the external teeth 58 are formed circumferentially around the ration gear 40, and extend generally outwardly along the exterior of the gear 40. The exterior teeth 58 and grooves 60 of the ration gear 40 operatively engage the beam gear's teeth 36 and grooves 38, such that when the beam gear 26 rotates, movement of the beam gear's teeth 26 is transferred to the external teeth 58 of the electrical ration gear 40, forcing the ration gear 40 to rotate about its axis. Conversely, when the bike 10 is in a normal running mode, the beam gear 26 is stationary, and the ration gear 40 is stationary In order for the gear bike 10 to operate in a normal mode, and an automatic mode, the gear assembly 18 includes a planetary gear system 42, including a plurality of planetary gears 44 a-e, a hub 48 for transferring power to the rear tire 14, a hub embedded gear 46 or sun gear 46 connected to the hub 48 and adapted for operative engagement with the planetary gears 44 a-e, a cylindrical bearing 50 mountable to the hub 48 to facilitate movement, a flywheel 52 adapted to operatively engage the planetary gears 44 a-e, and, a stopper ring 54 and bracket ring 56 combination, for cooperatively securing the planetary gears 44 a-e to the flywheel 52.

The ration gear 40 has an opening 62 formed therein, defining a chamber 62 adapted to receive the planetary gear system 42 and respective planetary gears 44a-e, and sun gear 46. The ration gear 40 includes a plurality of interior teeth 64 formed circumferentially about the interior of the chamber 62 and configured to operatively engage the planetary gears 44a-e. The planetary gear system 42 includes five planetary gears 44 a-e. Notably, it is contemplated that any number of planetary gears 44a-e suitable for providing operative engagement with the electric ration gear 40 to transfer power from the electrical ration gear 40 to the tire 14 can be used.

Figure 3:
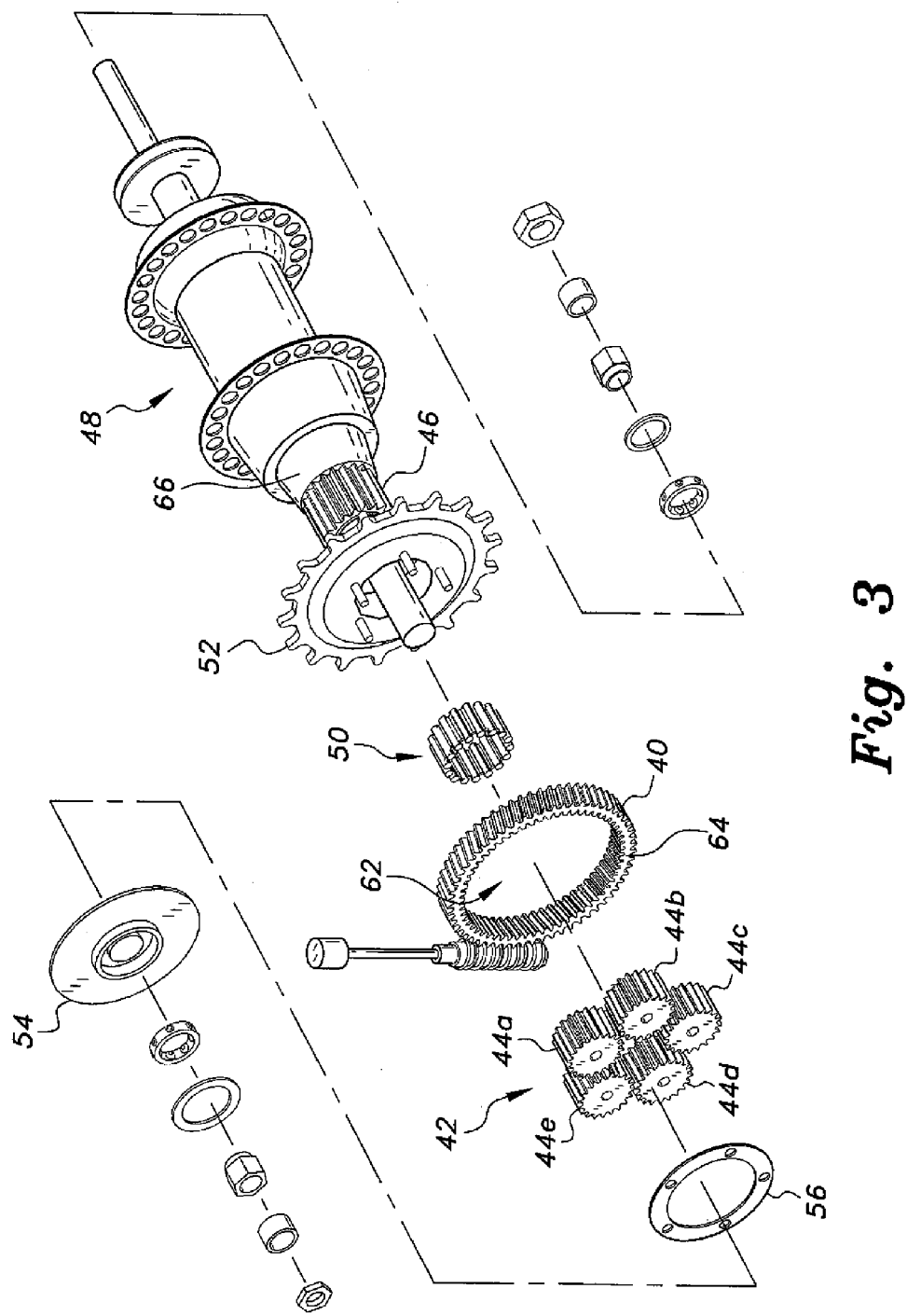
FIG. 3 is an exploded perspective view of the motor assembly and gear assembly, according to the present invention.
Figure 4:
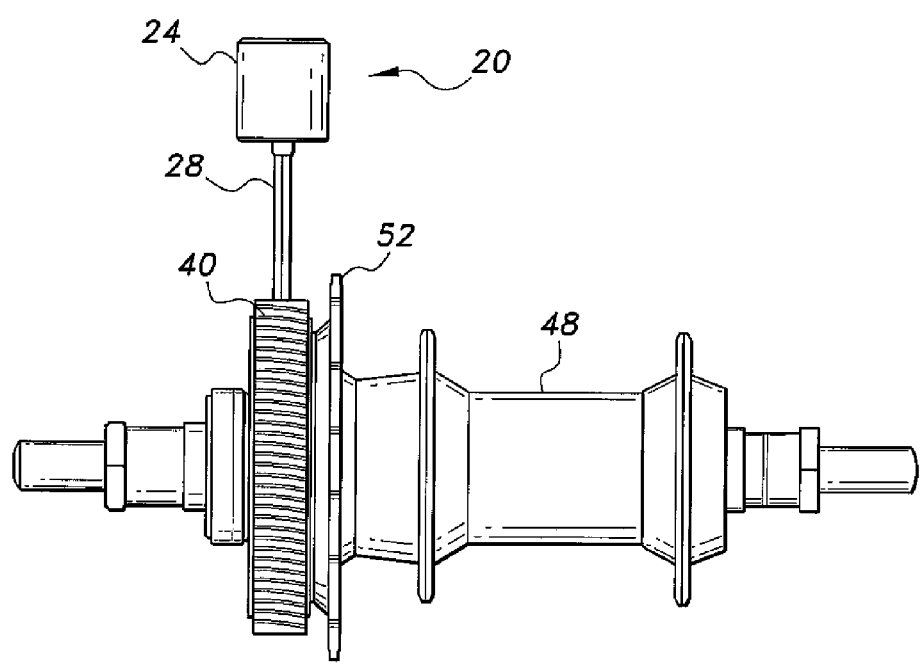
FIG. 4 is a side view of the motor assembly operatively connected to the gear assembly and hub, according to the present invention.
Figure 5:
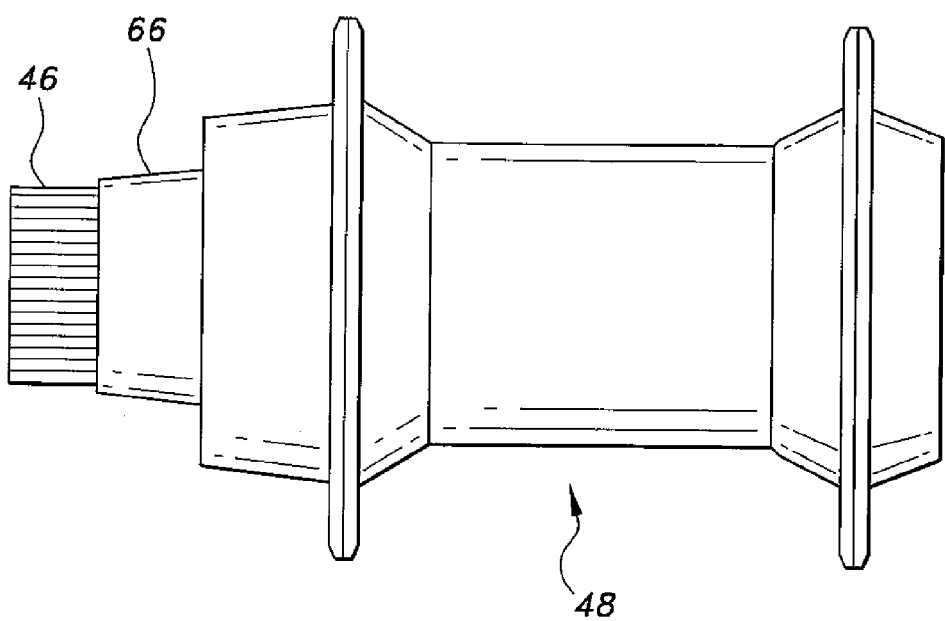
FIG. 5 is a side view of the hub operatively connected to a hub embedded gear, according to the present invention.

As illustrated in FIGS. 3-5, the sun gear 46 can be fixed to the hub 48. In an assembled configuration, the sun gear 46 is positioned central to the planetary gears 44 a-e. The sun gear 46 has a generally circular configuration, and includes a plurality of teeth and respective grooves formed between the teeth for operative engagement with the planetary gears 44 a-e. The planetary gears 44 a-e are configured to rotate generally around the sun gear 46 such that as the ration gear 40 is rotating in one direction, the planetary gears 44 a-e rotate around the sun gear 46, in an opposing direction, transferring power to the sun gear 46 which rotates in a direction opposing the planetary gears 44 a-e.

Figure 6A:
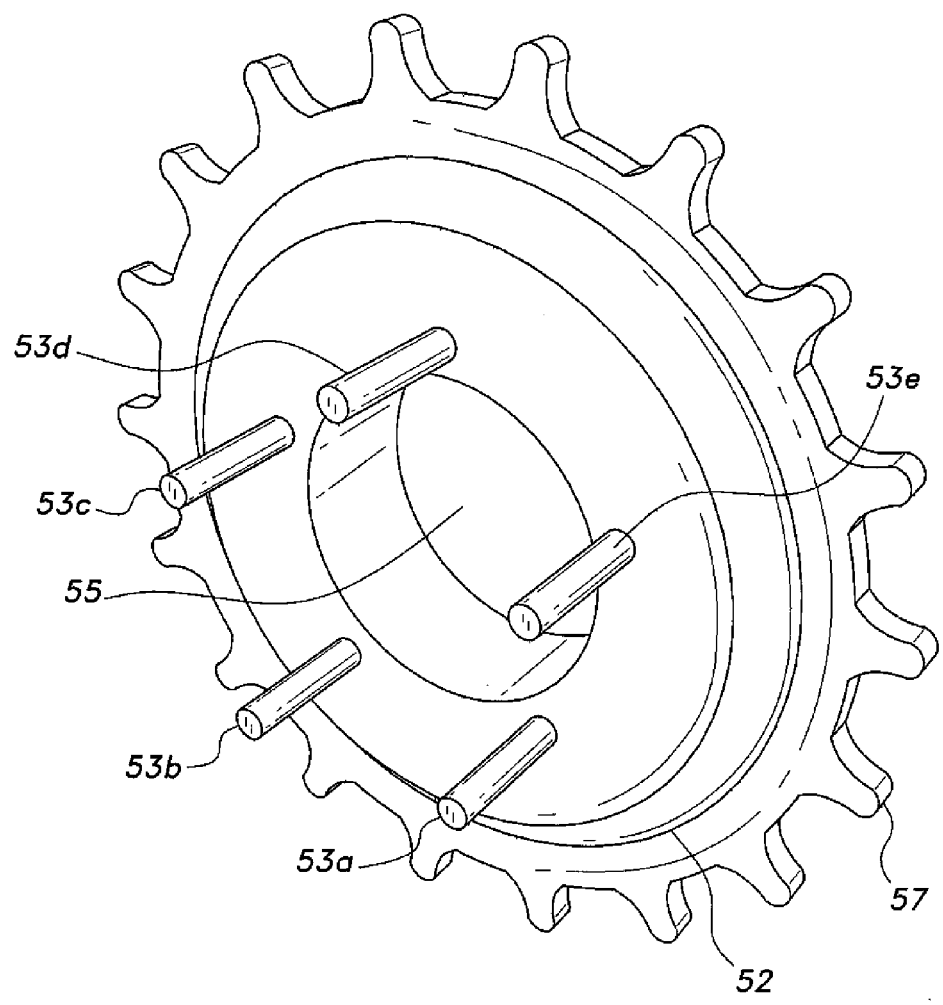
FIG. 6a is a frontal perspective view of the flywheel including axes positioned in spaced relationship, according to the present invention.
Figure 6B:
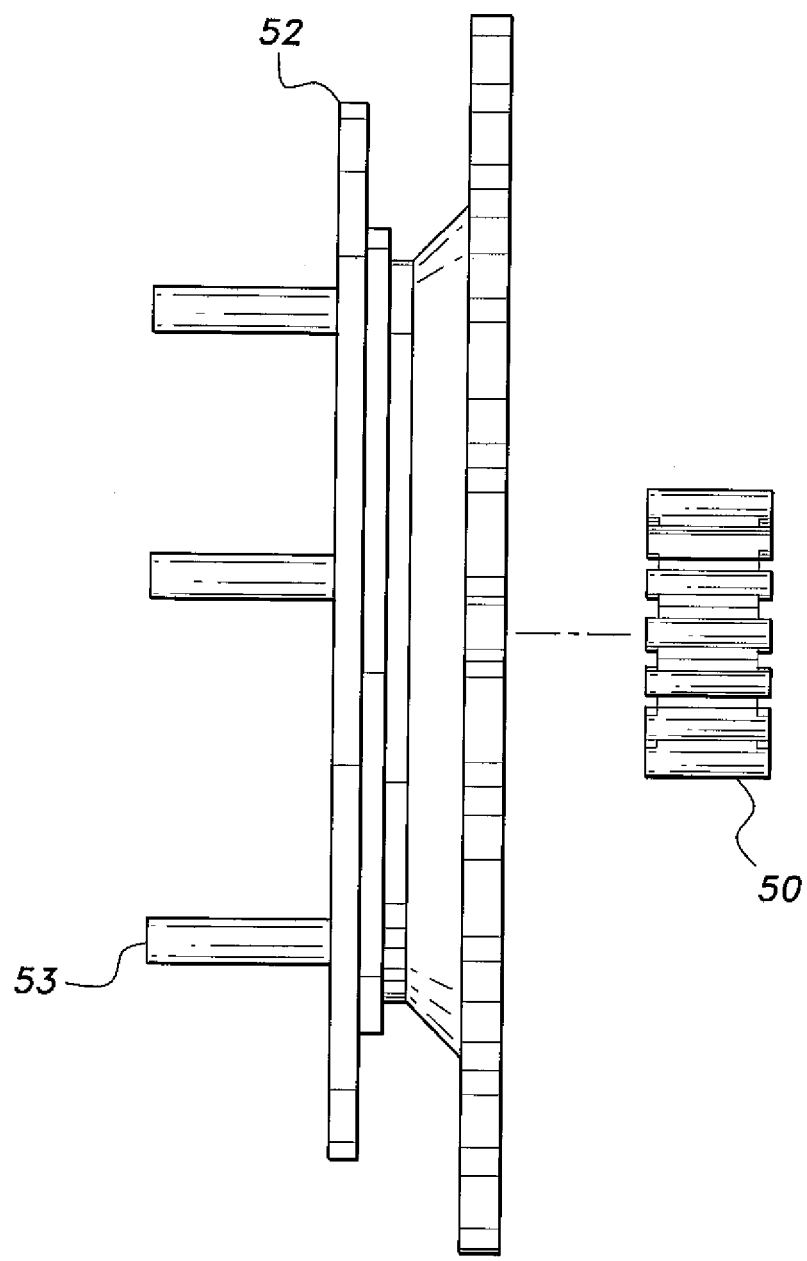
FIG. 6b is a side view of the flywheel and cylindrical bearing, illustrating the aligned positioning of the cylindrical bearing relative to the flywheel, according to the present invention.
Figure 6C:
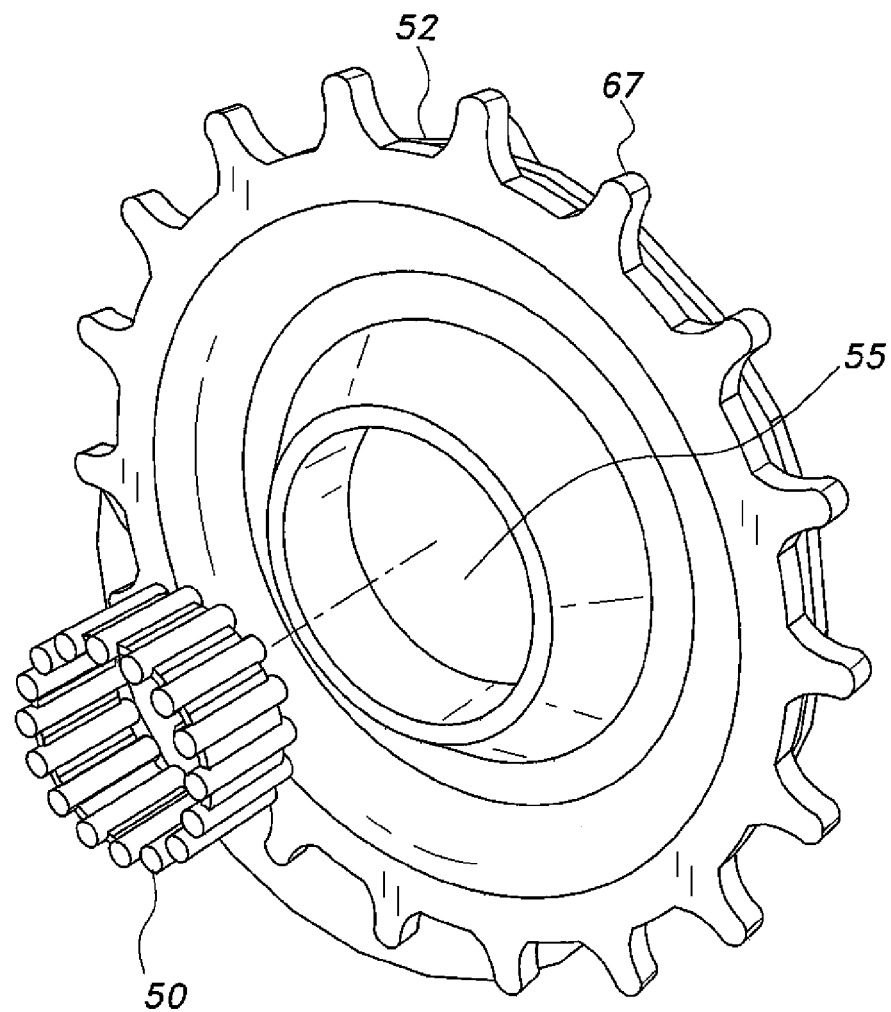
FIG. 6c is rear perspective view of the flywheel and an aperture formed therein to receive a cylindrical bearing, according to the present invention.

Continuing to FIGS. 6A-C, the flywheel 52 is adapted to receive rotational movement of the planetary gears 44 a-e around the sun gear 62. The flywheel 52 has a generally circular configuration with an aperture 55 formed therein to receive the cylindrical bearing 50. As shown, the flywheel 52 includes a plurality of axes 53 a-e, which extends generally outwardly from the base of the flywheel 52. As shown, the axes 53 a-e have a generally cylindrical configuration and are positioned in spaced relationship to each other, such that each respective axes 53 a-e can each receive one of the respective planetary gears 44 a-e. The flywheel 52 further includes a plurality of teeth 67 extending generally outward from the circumference and adapted to receive the bike's chain 68.

Figure 7:
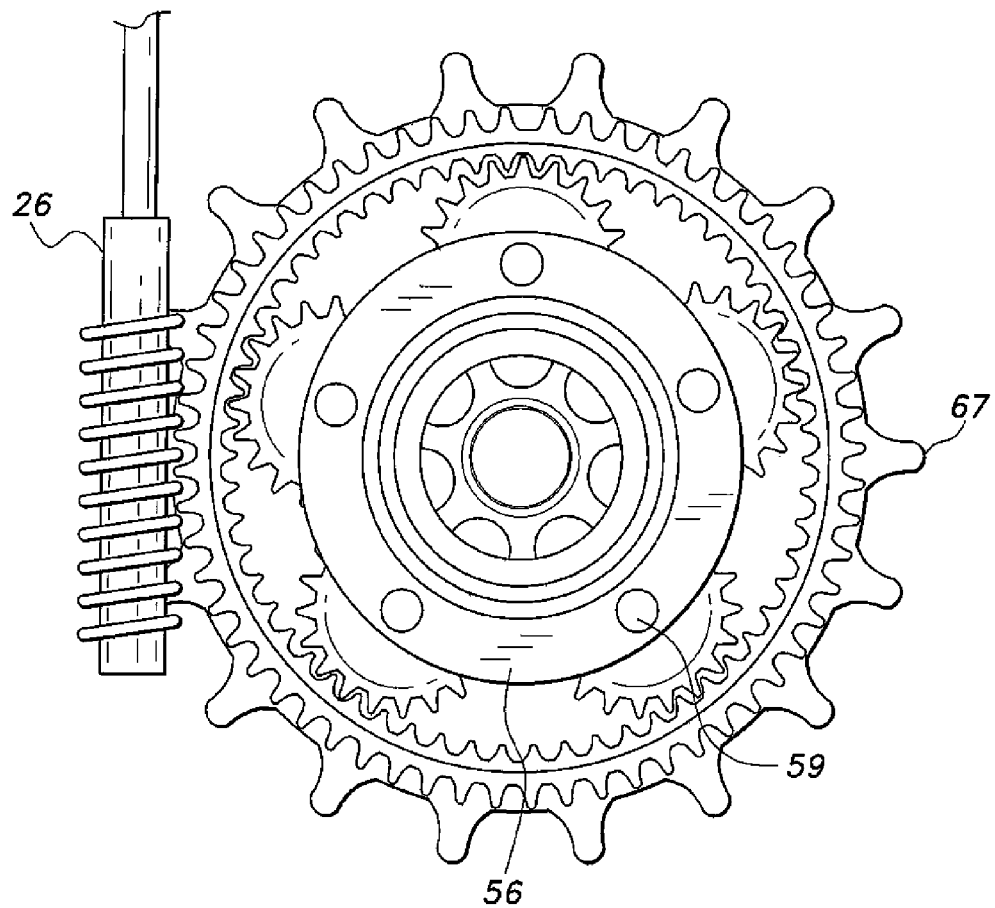
FIG. 7 is a side view of the bike control system illustrating the cooperative engagement of the motor assembly and the gear assembly and a stopper ring.

As shown in FIG. 5, the hub 48 includes a ring 66 formed on a portion of the hub 48, and adapted to receive the cylindrical bearing 50. As shown in FIG. 3, the cylinder bearing 50 can be embedded between the flywheel 52 and hub 48, and rests on the ring 66 to facilitate rotation of the flywheel 52, relative to the hub 48. The flywheel 52 is mounted to the cylindrical bearing 50 As illustrated in FIG. 5, the stopper ring 54 and bracket ring 56 secures electrical ration gear 40, and the planetary gears 44a-e to the flywheel 52, such that rotational movement of the planetary gears 44 a-e is transferred into rotational movement of the flywheel 52. As shown in FIG. 7, the bracket ring 56 has a generally circular configuration. The bracket ring 56 has a series of openings 59 adapted to individually receive respective planetary axes 53 a-e of the flywheel 52.

In an automatic mode, the control assembly 22 provides automatic speed control to the bike 10, by receiving speed data, and then sending a control signal to the remotely connected motor assembly 20, in order to increase or decrease the speed of the bike 10. Continuing to FIGS. 8 and 9, the control assembly 22 can include a controller 70, a first sensor 72 and, a second sensor 74, in communication with the controller 70.

Figure 8:
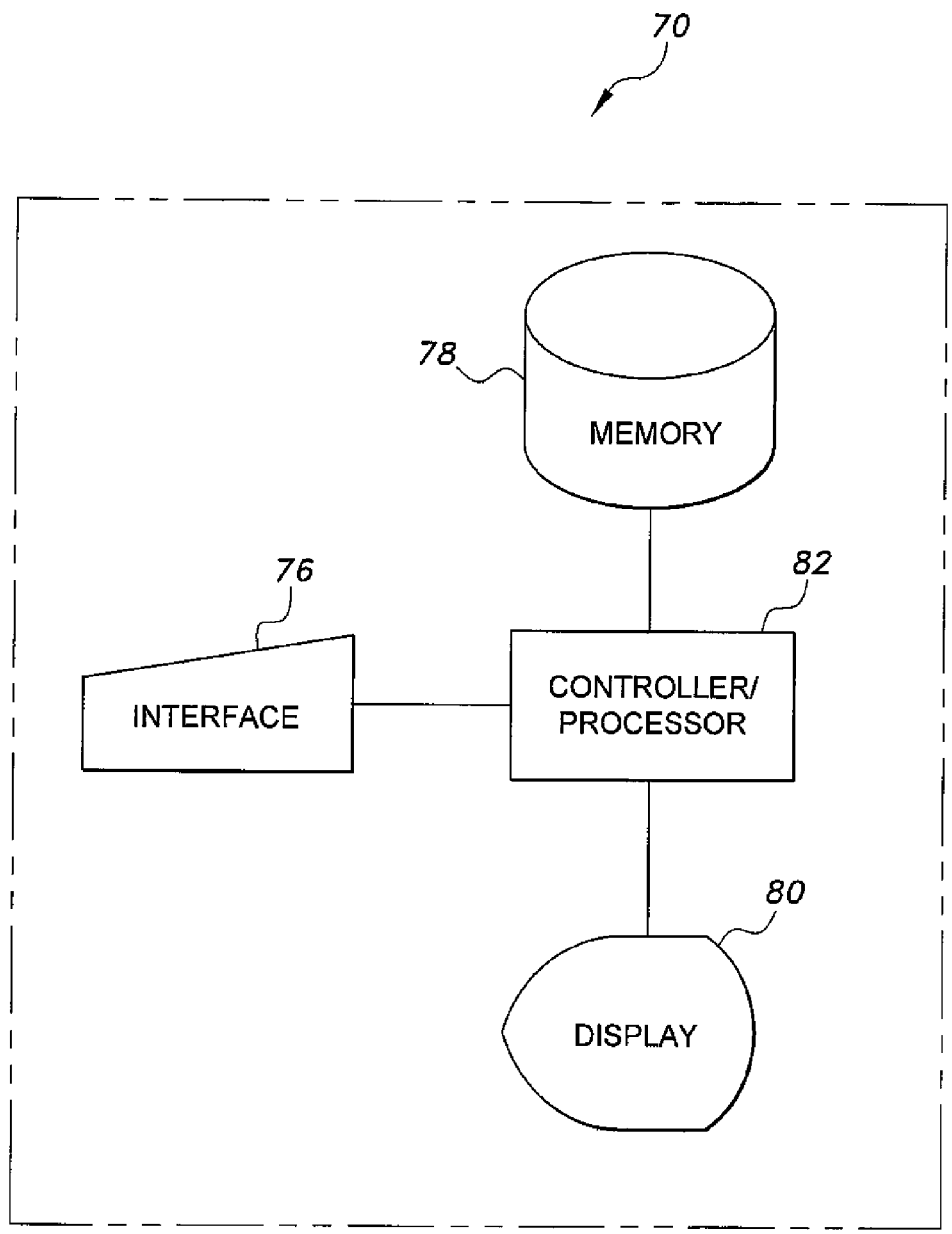
FIG. 8 is a schematic view of an embodiment of the controller, according to the present invention.
Figure 12:
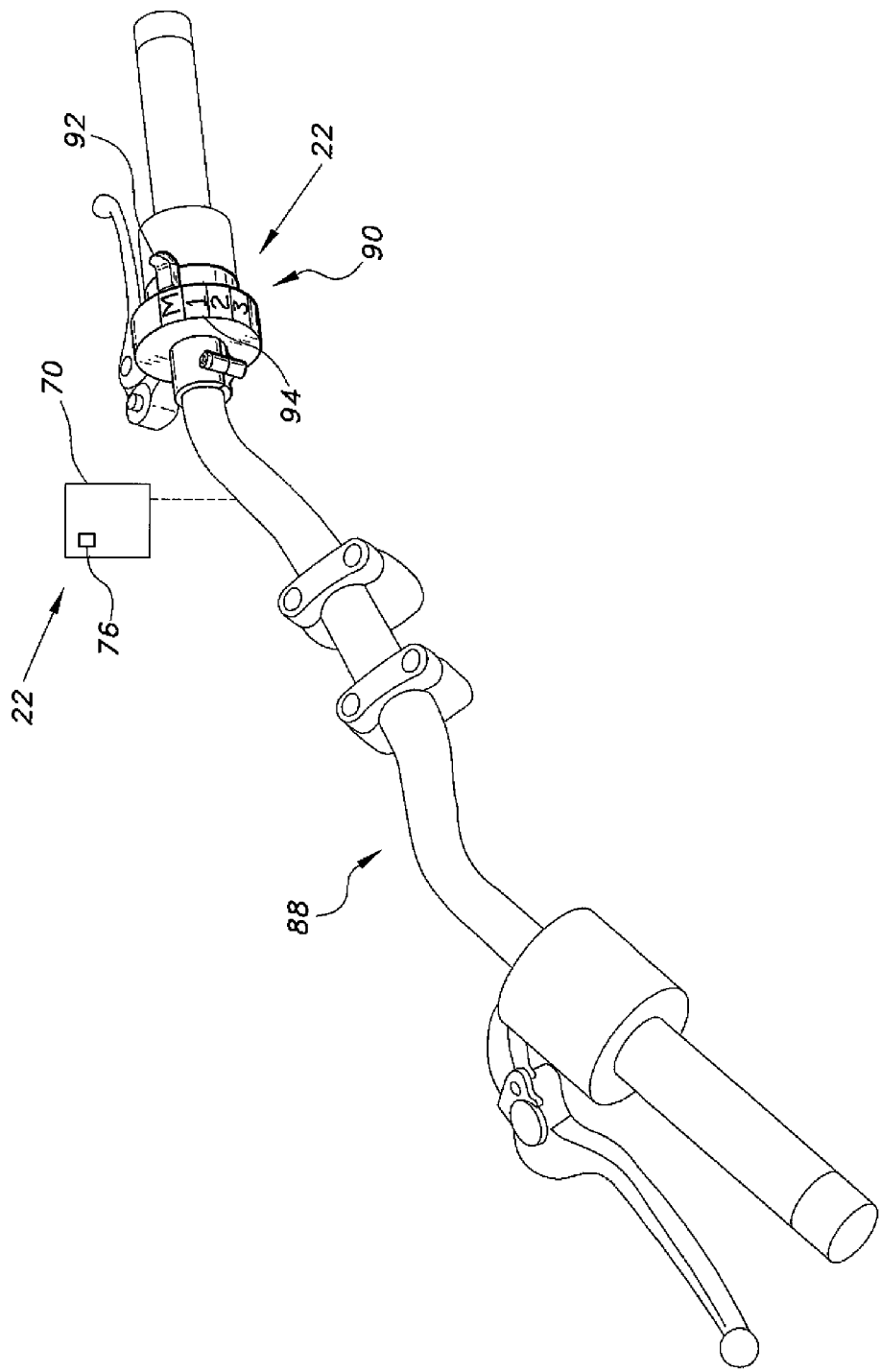
FIG. 12 is a perspective view of a handle bar assembly illustrating another embodiment of the controller, according to the present invention.

FIG. 8 illustrates a controller 70 for implementing embodiments of apparatuses and methods for automatically controlling the gear bike 10. It should be understood that the controller 70 may represent, for example, a portable computing device, a cell phone, smart phone, a PDA, or networked portable device having a transmitter capable of communicating with the motor transmitter 34. As illustrated in FIG. 12, the controller 70 of the control assembly 22 can be mounted to the bike handle bars 88 or held by the operator remotely. A user can select a desired speed via the user interface 76, and data may be stored in computer readable memory 78, which may be any suitable type of computer readable and programmable memory. It is further contemplated that the controller 70 can provide navigational information, such as a map and speed.

The sensors 72 and 74 can provide signals to the control assembly 22 controller 70. As such, the controller 70 using algorithms and/or formulas generally known, can calculate the speed and send a control signal by the processor 82. This information may be displayed on the display 80, which may be any suitable type of computer display. The controller/processor 82 may be associated with, or incorporated into, any suitable type of computing device, for example, a personal computer or a programmable logic controller 82. The display 80, the processor 82, the memory 78, and any associated computer readable media are in communication with one another using a data bus or any suitable type of device.

Figure 9:
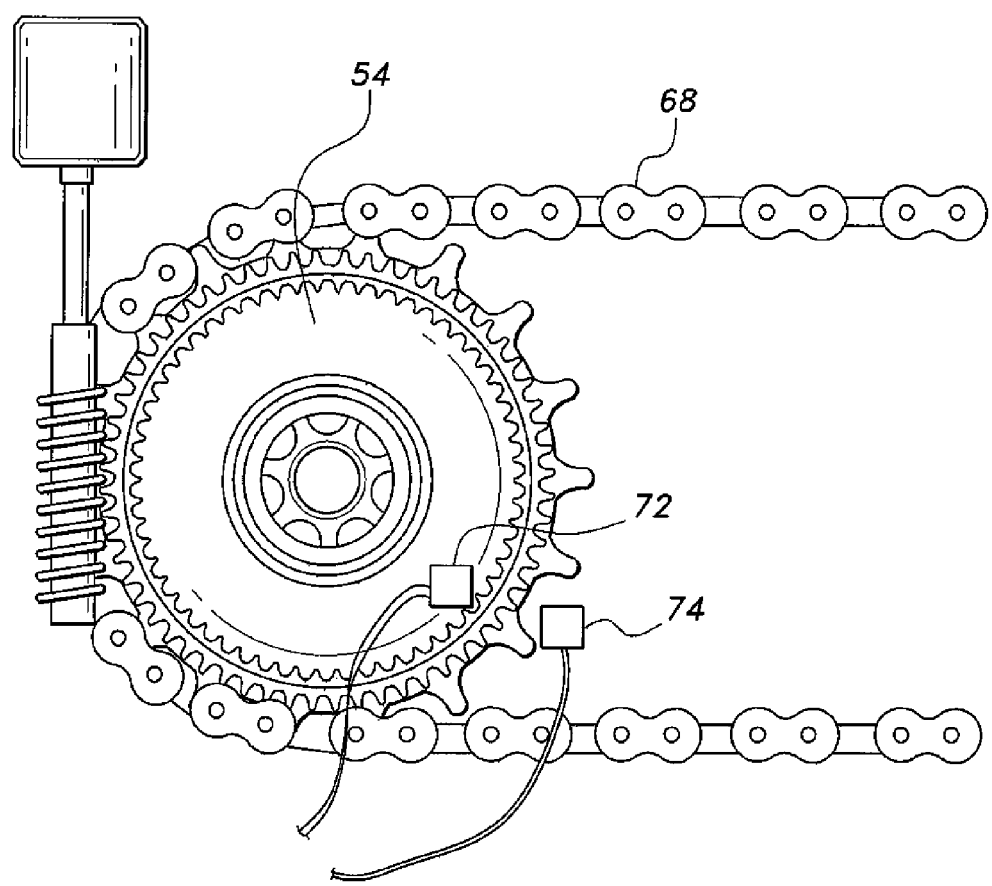
FIG. 9 is side view of the bike gear assembly and control assembly illustrating the sensors provided in proximate relation to the election ration gear and tire.

As shown, FIG. 9 the sensors 72, and 74 are positioned generally about the exterior of the bike 10 to detect respective movements of the bike tire 14, and the ration gear 40. As shown, the first sensor 72 is provided proximate to the electrical ration gear 40 to detect movement of the electrical ration gear 40, and further transmit the detected speed of the electric ration gear 40 to the controller 70. The first sensor 72 can be a hall-effect sensor 72, however it is contemplated that any type of sensor suitable to detect the velocity or motion of ration gear 40 can also be used, with departing from the scope of the invention.

As shown, the second sensor 74 can also be a hall-effect sensor 74 for detecting the speed of the tire 14. As shown, the sensor 74 is provided generally adjacent to the tire 14 to detect the rotational speed of the tire 14 and send the data to the controller 70.

In operation of the automatic gear bike 10 having a bike speed control system 12, the user selects a desired operating mode, which in this embodiment, can be a normal driving mode, or automatic mode. In automatic mode, the user selects a desired bike speed value, which can be, for example 10 km/h. This selection can be done by either inputting the value directly into the controller 70 using the interface 76, or by remotely transmitting the value to the controller 70, via Bluetooth, wireless and/or any other tools suitable for transmitting signals remotely.

The controller 70 detects speed of the bike 10, in real time, by detecting the rotational speed of the tire 14 and/or also detecting the rotational speed of the ration gear 40. The detected rotational speed data is transmitted to the controller 70 either through hardwired connection to the controller 70 or wirelessly. In addition, the motor 24 and motor controller 32 transmits operating power data to the controller 70 using the transmitter 34. The controller 70 calculates the real time speed of the bike 10 based on the rotational speeds of the tire 14 and electric ration gear 40, respectively. The calculated real-time bike speed is compared to the pre-selected bike speed. Based on the, the comparison controller 70 sends a signal to the motor assembly 14 to either activate the motor speed control in order to speed up the bike 10, or reduce or stop the speed of the motor 24, to slow down the automatic gear bike 10.

Figure 10:
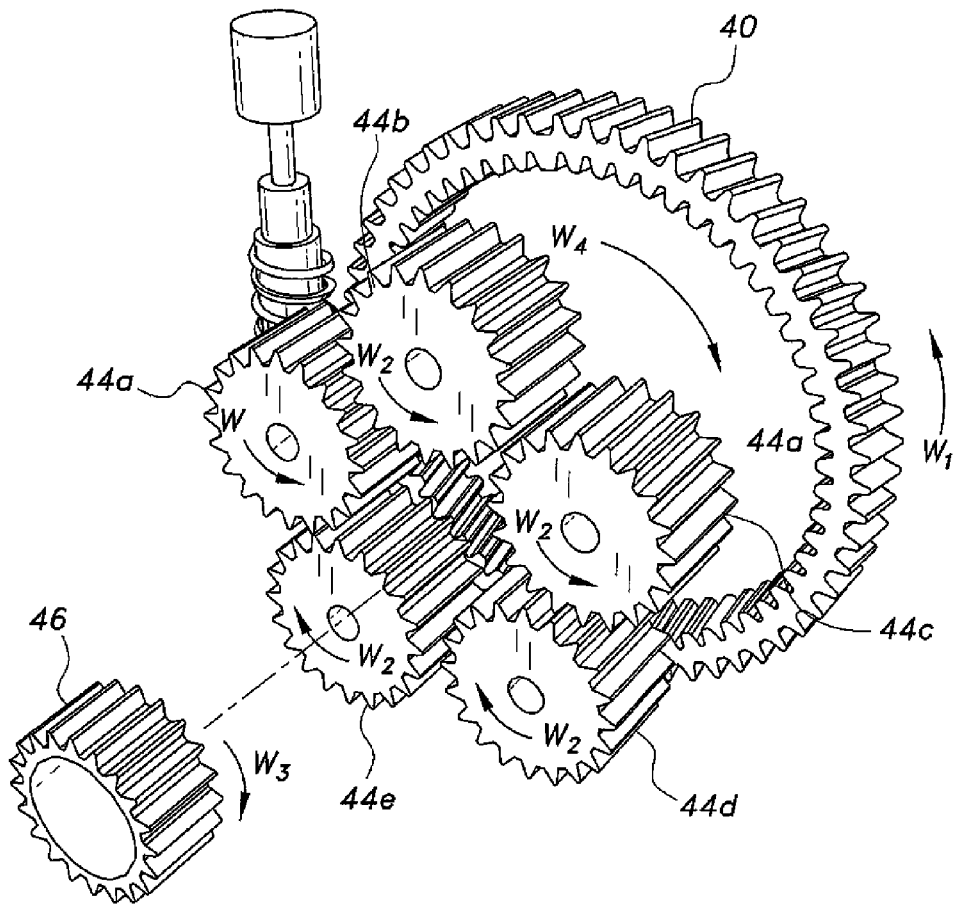
FIG. 10 is an exploded perspective view illustrating the rotational relationship of the planetary gear system and hub embedded gear.

In the event that the speed of the bike 10 is less than that of the pre-selected desired speed by the operator, the motor 24 is activated, thus providing power to the bike 10. When the motor 24 is activated, the motor 24 rotates the shaft 28 and operatively connected beam gear 26. As the beam gear 26 rotates, the gear teeth 36 and grooves 38 cooperatively engage the teeth 58 and grooves 60 of the electric ration gear 40 thereby rotating the ration gear 40. As illustrated in FIG. 10, rotation of the electric ration gear 40 at the speed of $w_1$ transfers power to the planetary gear system 42. The planetary gears 44 a-e located in the chamber 62 of the ration gear 40, and rotate within the ration gear in a counter direction at the speed of $w_4$. The respective planetary gears 44 a-e rotate around hub embedded gear 46 at a speed of $w_2$. As the planetary gears rotate 44 a-e, power is transferred to the respective flywheel axes 53 a-e which, thus causing the flywheel 52 to rotate at a speed of $w_1$.

As the planetary gears 44 a-e rotate, power is also transferred to the hub embedded gear 46 or sun gear 46 which rotates at a speed of $w_3$. The hub embedded gear 46 transfers power to the hub 48, thus providing power to the connected tire 14. As stated, the rotational speed of the electric ration gear 40 and tire 14 is detected by respective sensors 72, and 74, in real time, and transmitted to the controller 70. The processor 82 calculates the speed of the bike 10 using known formulas and algorithms. The calculated speed value is compared to that of the pre-selected speed value.

As such, once the real-time speed of the bike and the pre-selected speed are substantially equal to that of, the real time speed, a signal is sent from the controller 70 to the motor assembly 22 slowing down or stopping the motor 24, thereby reducing the power transmitted to the beam gear 26, the operatively connected ration gear 40 and hub 48. When movement of the ration gear 40 is prevented, or the beam gear 26 is stationary, the planetary gears 44 a-e may still rotate about the inner chamber 62, and the hub 48 and flywheel 52 can still rotate axially, enabling the bike 10 to function in a normal mode or non-powered mode.

In a normal driving mode, the gear bike 10 is not dependent on the movement of the motor 24 and ration gear 40. As such, the beam gear 26, and ration gear 40, are in a stationary position and the planetary gears 44a-e rotate internally within the chamber 62, as illustrated, manual movement of the bike pedals force the chain 68 to rotate the flywheel 52. Rotation of the flywheel 52 transfers power to the planetary gears 44a-e. As such, the planetary gears 44 a-e rotate within the chamber 62, as the hub embedded gear 46 rotates. As the hub embedded gear 46 rotates, the hub 48 rotates, transferring power to the rear tire 14. Further examples illustrating the relationship between the bike speed, motor speed and the ration gear ('ERG") speed are shown in FIG. 11.

In an embodiment of automatic gear bike 10, shown in FIG. 12, the control assembly 22 includes a manual hand controller 90 having a transmitter for communicating with the motor transmitter 34, and respective sensors 72 and 74. As shown, the hand controller 90 is mountable to the bike 10, such as the bike handle bars 88. The hand controller 90 can be manually operated, and can include a lever 92 to select between automatic mode and manual mode. As shown, the hand controller 90 further includes a gage display 94. As shown the gage display 94 can include an operation selector, designated for the user to select the desired ride mode. The hand controller 90 can include aforementioned processor and memory for calculating the bike speed It is contemplated that a user has a variety of possible speeds to operate at. For example it is contemplated that the user select between M, which is manual mode, or motor off mode, 1) long drive mode; 2) city use mode, and 3) climbing mode. The hand controller 90 is in communication with the motor transmitter 34 and motor controller 32 to control power provided to the motor 24. The connection between the motor transmitter 34 and controller 90 can be a hardwired connection or a remote connection.

The user selects the preferred operating mode. For example, in a long distance drive mode, the hand controller 90 sends a signal to the motor transmitter 34 and motor controller 32 with directions for the motor 24 to operate at a constant selected speed suitable for driving in an open area, which would not require frequent stopping. In a city use driving mode, it is contemplated that the power transferred to the beam gear 26 and ration gear 40 is less than that of the long distance driving mode, considering numerous stops that can be anticipated in the city. In a climbing mode, it is contemplated that the controller sends a signal to the motor 24 to deliver power to the ration gear 40 suitable to provide a steady speed to the bike 10 against and inclined terrain.

Figure 13:
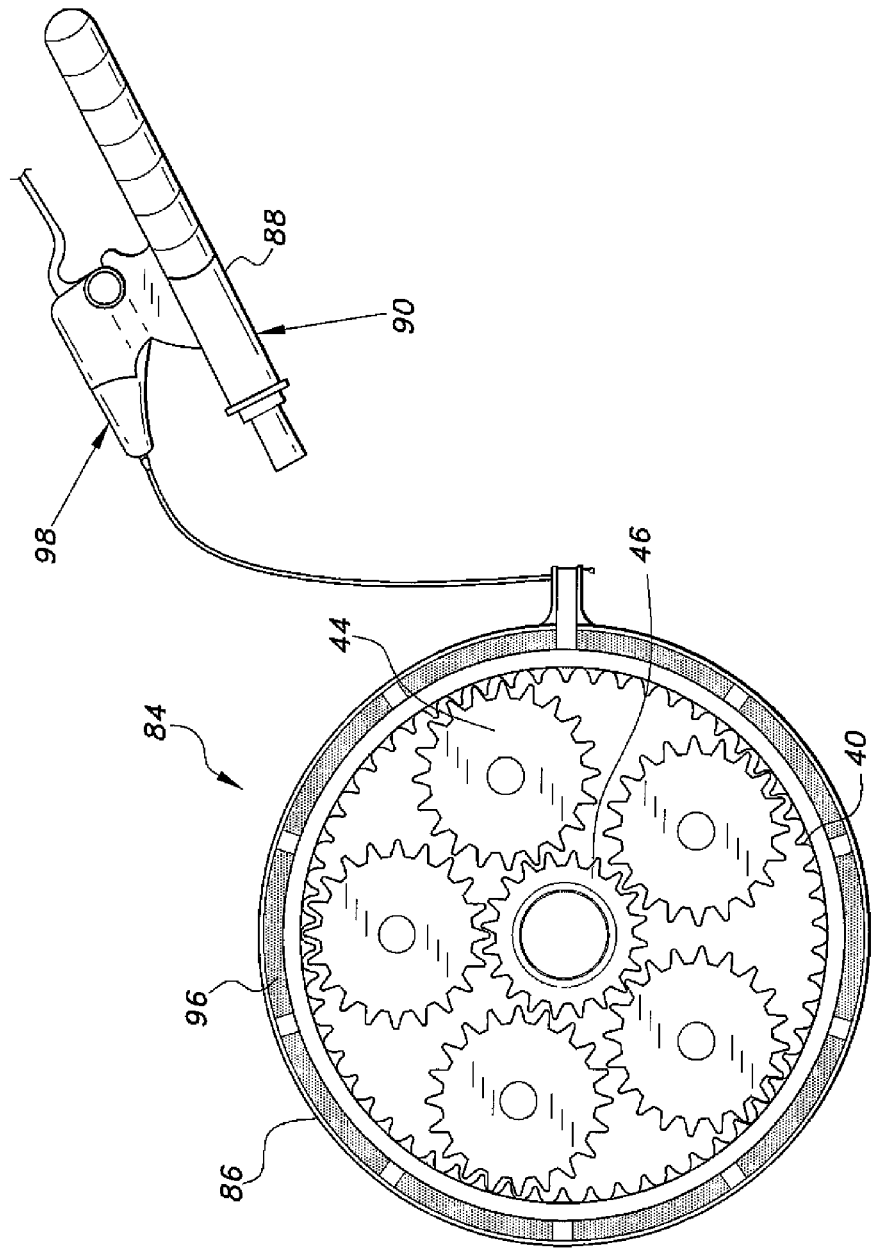
FIG. 13 is a side view of an embodiment of a control assembly having a braking assembly in operative engagement with the ration gear, according to the present invention.

In an embodiment of the automatic gear bike 10, shown in FIG. 13, the automatic gear bike 10 provides for a manual operation to control movement of the ration gear 40. As shown, a braking assembly 84 is provided for operative engagement with the ration gear 40 of the gear assembly 18. The braking assembly 84 includes a ring 86 having a generally circular configuration, and a plurality of brake pads 96. The brake pads 96 are disposed in the interior of the ring 86 and positioned in spaced relationship therein.

As shown, the brake pads 96 are configured for engagement with the exterior of the electrical ration gear 40. The brake assembly 84 receives a signal from the controller 90 to control speed of the electrical ration gear 40. By manually applying pressure to the gears 98, the gear 98 in connection with the brake assembly 84 applies pressure to the assembly 84, causing the ring 86 to contract into forced engagement with the ration gear 40, to prevent movement of the ration gear 40. As such, the planetary gears 44a-e rotate along the interior of the ration gear 40 and the hub embedded gear 46 freely rotates enabling the hub 48 and connected tire 14 to rotate.

It is to be understood that the present invention is not limited to the embodiments described above, but encompasses any and all embodiments within the scope of the following claims.

I claim:

1. An automatic gear bike having a speed control system, comprising:
    a control assembly including a controller in communication with at least one sensor, wherein the at least one sensor detects the bike speed and sends a signal to the controller,
    a motor assembly in communication with the controller and adapted to receive control signals from the controller, the motor assembly includes a motor, a motor controller and a beam gear operatively connected to receive power from the motor;
    a gear assembly includes a ration gear, a planetary gear system, a hub, and hub embedded gear, the ration gear is operatively connected to the beam gear, and the hub embedded gear is connected to the hub;
    wherein the planetary gear system includes a plurality of planetary gears adapted to rotate about the interior of the ration gear, and a flywheel adapted to engage a bike chain, the flywheel including a plurality of axes operatively connected to the respective plurality of planetary gears such that power is transferred between the planetary gears and the flywheel;
    wherein the controller receives a signal from the at least one sensor to detect the bike speed, and compares the detected bike speed to a pre-selected bike speed and, based on the comparison, sends a signal to the motor to selectively transfer power to the beam gear and operatively connected gear assembly, in order to increase or decrease the bike speed such that the bike speed is substantially equal to the pre-selected speed.

2. The automatic gear bike according to claim 1, wherein the at least one sensor
    includes a first sensor to detect the speed of a tire of the bike and a second sensor to detect the speed of the ration gear wherein the controller uses the detected ration gear speed and the detected tire speed to process the real-time bike speed.

3. The automatic gear bike according to claim 2 wherein gear assembly is mounted to the bike, proximate to a rear tire of the bike, the hub being operatively connected to the rear tire to transfer power from the gear assembly to the rear tire.

4. The automatic gear bike according to claim 1, wherein the planetary gear system includes five planetary gears to operatively engage the hub embedded gear and the flywheel includes five axes to receive the respective five planetary gears.

5. The automatic gear bike according to claim 1, wherein the controller includes a manual lever for selecting the bike operating mode between manual mode and automatic mode.

6. The automatic gear bike according to claim 5, wherein the manual lever enables a user to switch the desired speed between a first speed, a second speed and a third speed.

7. The automatic gear bike according to claim 1, wherein the controller is in wireless communication with the motor assembly to control the speed of the motor.

8. The automatic gear bike according to claim 1, wherein the controller has a hard wired connection to the motor assembly to control the speed of the motor.

9. The automatic gear bike according to claim 7, wherein the controller is a smartphone.

10. A multi-functional automatic gear bike, comprising:
    a control assembly including a controller in communication with at least one sensor to select between manual mode and automatic mode, wherein the at least one sensor detects the speed of the bike and sends a signal to the controller,
    a motor assembly in communication with the controller and adapted to receive control signals from the controller, the motor assembly including a motor, a motor controller and a beam gear operatively connected to receive power from the motor;
    a gear assembly including a ration gear having an interior chamber, a hub, and hub embedded gear, the ration gear is operatively connected to the beam gear and the hub embedded gear is connected to the hub;
    wherein the controller is selected between automatic mode and manual mode;
    wherein in automatic mode, the controller receives a signal from the at least one sensor of the detected bike speed and compares the detected bike speed to a pre-selected bike speed and based on the comparison, selectively transfers power to the beam gear and ration gear to move an operatively connected bike tire in order to achieve the desired bike speed; and in manual mode, the controller sends a signal to the motor controller to stop the motor, such that the beam gear and ration gear are stationary and a flywheel responds to user pedaling movement of the chain, such that the flywheel transfers power to the planetary gears to rotate to transfer power to the hub embedded gear and the connected hub.

* * * * *